(12) United States Patent
Bushbaum

(10) Patent No.: US 8,152,228 B2
(45) Date of Patent: Apr. 10, 2012

(54) VEHICLE MOUNTING COLLAR

(75) Inventor: Brandon W. Bushbaum, Naches, WA (US)

(73) Assignee: AMTECH, LLC, Wapato, WA (US)

( * ) Notice: Subject to any disclaimer, the term of this patent is extended or adjusted under 35 U.S.C. 154(b) by 263 days.

(21) Appl. No.: 12/586,883

(22) Filed: Sep. 28, 2009

(65) Prior Publication Data
US 2011/0074174 A1 Mar. 31, 2011

(51) Int. Cl.
*B60J 7/00* (2006.01)
(52) U.S. Cl. .................. 296/193.03; 296/164
(58) Field of Classification Search .............. 296/166, 296/164, 167, 35.3, 193.03, 190.02, 208
See application file for complete search history.

(56) References Cited

U.S. PATENT DOCUMENTS

| | | | | |
|---|---|---|---|---|
| 4,294,485 A | * | 10/1981 | Engelhard | 296/166 |
| 5,004,293 A | * | 4/1991 | Thomas | 296/166 |
| 6,692,062 B1 | * | 2/2004 | Woodard et al. | 296/164 |
| 2004/0080182 A1 | * | 4/2004 | Adams et al. | 296/190.02 |

* cited by examiner

*Primary Examiner* — Joseph Pape
(74) *Attorney, Agent, or Firm* — Svendsen Legal, LLC.

(57) ABSTRACT

A collar system for a connecting the cab of a vehicle to the cargo bed cover or similar boxed attachment, the vehicle mounting collar including a webbed collar frame designed to mount to a standard driver's compartment or cab, without modification to the vehicle. The collar and attachment method are extremely flexible and accommodates any vehicle tolerance variation. The collar mounts to the rear flange on the cab of the vehicle, and the bulkhead of the collar has slots to receive the shell of the cargo bed cover. Shell bolts within the bulkhead slots allow the shell to be adjustably repositionable on the bulkhead of the collar by slippage of the shell bolts within the bulkhead slots.

10 Claims, 4 Drawing Sheets

VEHICLE MOUNTING COLLAR

TECHNICAL FIELD

The invention relates to a collar system for connecting the cab of vehicle to the cargo bed area, and specifically a vehicle mounting collar that includes a collar frame deigned to attach to a standard driver's compartment or cab, without modification to the vehicle. The collar and attachment method provide a flexible connection and accommodates the large variations encountered in manufacturing tolerances.

BACKGROUND OF THE INVENTION

Vehicles used in military and rescue are historically manufactured to perform a specific role, limiting the capabilities of the vehicle to those addressing the requirements of that role. Such specialized equipment requires a support team consisting of highly trained technicians to maintain and service the vehicle. With the specialized support equipment and tools required to keep the vehicle operational, the costs associated with this support infrastructure are significant.

Rescue vehicles need to be able to accommodate the transport of a crew from one location to another in order to facilitate the recovery of injured persons. Large open areas are required inside the vehicle in order to expeditiously move people and equipment from inside and outside the vehicle. Features such as large doors and flat level surfaces, suitable to fit several stretchers are necessary for the easy movement of injured people into and out of the vehicle. Vehicles used in this role are not typically used in offensive operations, but as backup support vehicles to follow offensive vehicles and recover casualties. The nature of the role the rescue vehicle performs precludes the use of features such as gun ports, heavy armor or weapon station hatches.

A problem with standard vehicle bases is that they fail to accept and work with a variety of add-on boxes or shelters for varying uses. Extensive and highly precise modifications to mass-produced vehicle bases or chassis, are required when adding many of these add-on boxes ore cargo bed covers, which adds considerable costs and prevents a baseline commonality prohibiting installation by generalized technicians and equipment. An adapter is needed that readily accepts the multitude of cargo bed covers and similar "add-ons," either for military or rescue in nature, without extensive modification to the vehicle, accommodating vehicle variations within manufacturing tolerances.

The following is a disclosure of the present invention that addresses these problems and shortcomings of prior vehicle cover mounting systems, and will be understood by reference to the following detailed description taken in conjunction with the accompanying drawings.

Figure 1:
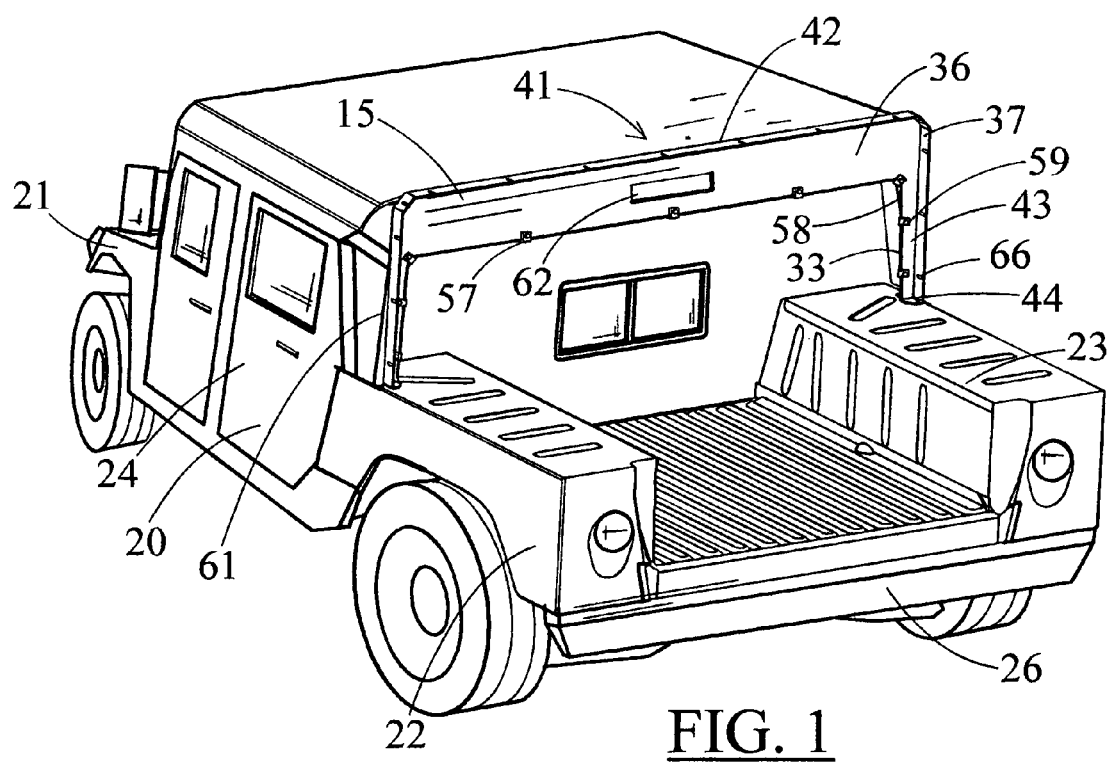
FIG. 1 is a perspective view of a vehicle mounting collar, as mounted to a vehicle, according to an embodiment of the invention.

Reference characters included in the above drawings indicate corresponding parts throughout the several views, as discussed herein. The description herein illustrates preferred embodiments of the invention, and the description herein is not to be construed as limiting the scope of the invention in any manner. It should be understood that the above listed figures are not necessarily to scale and that the embodiments may be illustrated by fragmentary views, graphic symbols, diagrammatic or schematic representations, and phantom lines. Details that are not necessary for an understanding of the present invention by one skilled in the technology of the invention, or render other details difficult to perceive, may have been omitted.

DETAILED DESCRIPTION OF SPECIFIC EMBODIMENTS

Figure 2:
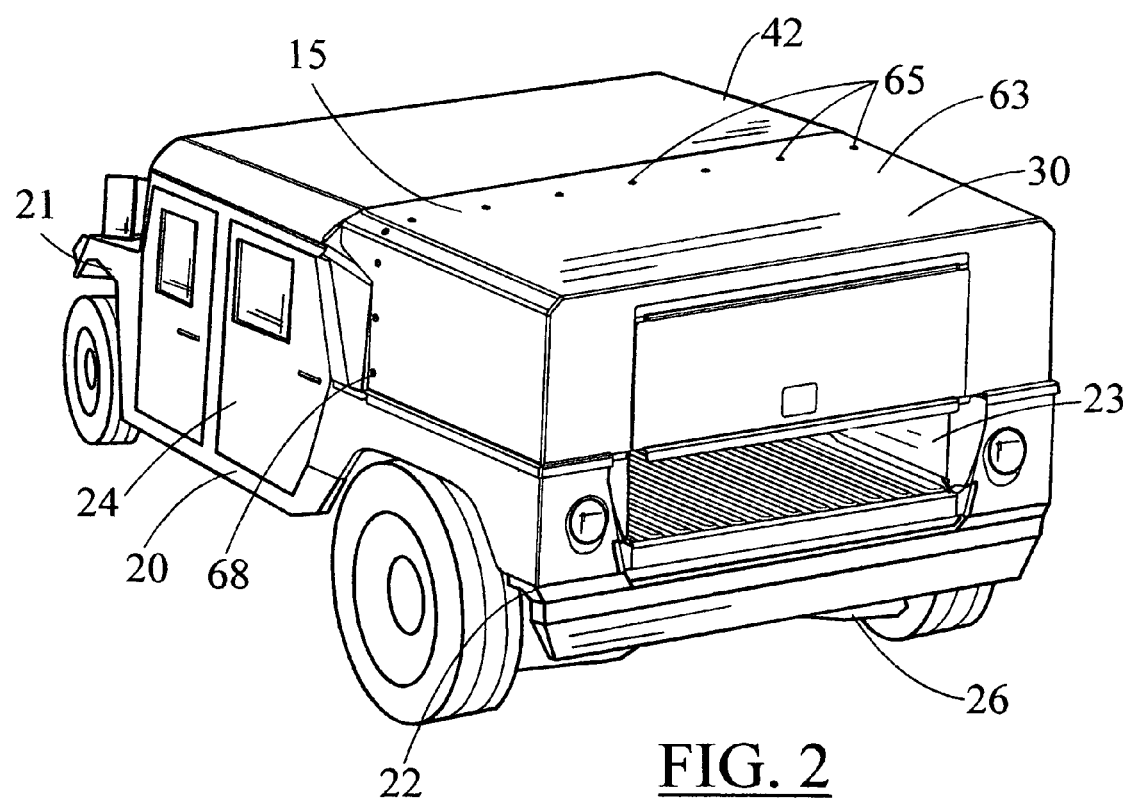
FIG. 2 is a perspective view of a vehicle mounting collar, as mounted to a vehicle, according to an embodiment of the invention.

The present invention provides for a vehicle mounting collar, specifically configured to connect the cab compartment to the cargo bed covering of a vehicle. FIGS. 1 through 4A show preferred embodiments of the vehicle mounting collar 15, mounted to a specialized vehicle 20. For the present disclosure, the vehicle mounting collar may be referred to herein, simply as the "collar," and the specialized vehicle may be any conventional military or rescue type of specialized vehicle, but typically a four-wheel, or an all-wheel drive, motorized vehicle, such as the well-known HMMWV, or "Humvee." The HMMWV is a common acronym for the "high mobility, multipurpose wheeled vehicle," as built by AM General, LLC of South Bend, Ind., USA. The specialized vehicle may simply be referred to herein, as a "vehicle." As also referenced throughout this written specification, the vehicle includes a forward end 21 and a rearward end 22, as illustrated in FIGS. 1 and 2.

For the present invention, a bed 23 abuts to a cab 24 of the vehicle 20. The bed may be any platform or compartment, mounted or installed proximate to the rearward end 22 of the vehicle, as typically employed for the loading and transport of personnel, equipment, or other materials. The cab and bed mount upon a base frame 26 or simply the "base" of the vehicle. The base is the standard structural undercarriage, which is a primary component of the chassis in most conventional trucks and automobiles.

When the bed 23 of the specialized vehicle 20 requires covering, a soft covering may be employed, such as a canvas or flexible plastic material. However, especially in military applications, a hard covering is often required. Such hard coverings for specialized vehicles are commonly referred to as "cargo bed covers" 30, or simply CBC's. CBC's may be any firm shelled covering, shelter or container, typically box-shaped, that is received onto and mounts to the bed of the specialized vehicle.

The vehicle mounting collar 15 mounts behind the cab 24, which is itself mounted on the base frame 26 of an appropriate chassis of the vehicle 20. This vehicle mounting collar is designed to accept and work with a multitude of cargo bed covers 30, each designed for specific purposes, primarily either military or rescue in their nature.

The vehicle mounting collar 15 allows for the production of the standard specialized vehicle's base 26, to accept and work with a variety of box/shelter type of cargo bed covers 30, for varying uses. The collar of the present invention allows for mass production of the vehicle base, thus reducing costs. This advantage also provides baseline commonality that allows for installation, repair and support by more generalized technicians, auxiliary tools and equipment, especially as encountered in the field of operation.

The collar 15 allows for rapid attachment and detachment of said cargo bed covers 30. The collar also provides a forward sealing surface 33 for the CBC's to the cab 24. The collar also acts as the front integral support of the CBC's. The vehicle mounting collar is designed to attach to a standard driver's compartment or cab, without modification to the vehicle 20.

The vehicle mounting collar 15 is preferably fabricated from a milled metal material, and most preferably an aircraft grade of structural strength aluminum alloy, such as 5052, 6061, 7075, or 2024. Other alloys and materials are considered for use, such as titanium, structural steel alloys, or composite materials employing carbon fiber or plastics, as well known to those skilled in selecting materials engineered for use with military and rescue vehicles 20.

Figures 4, 4A:
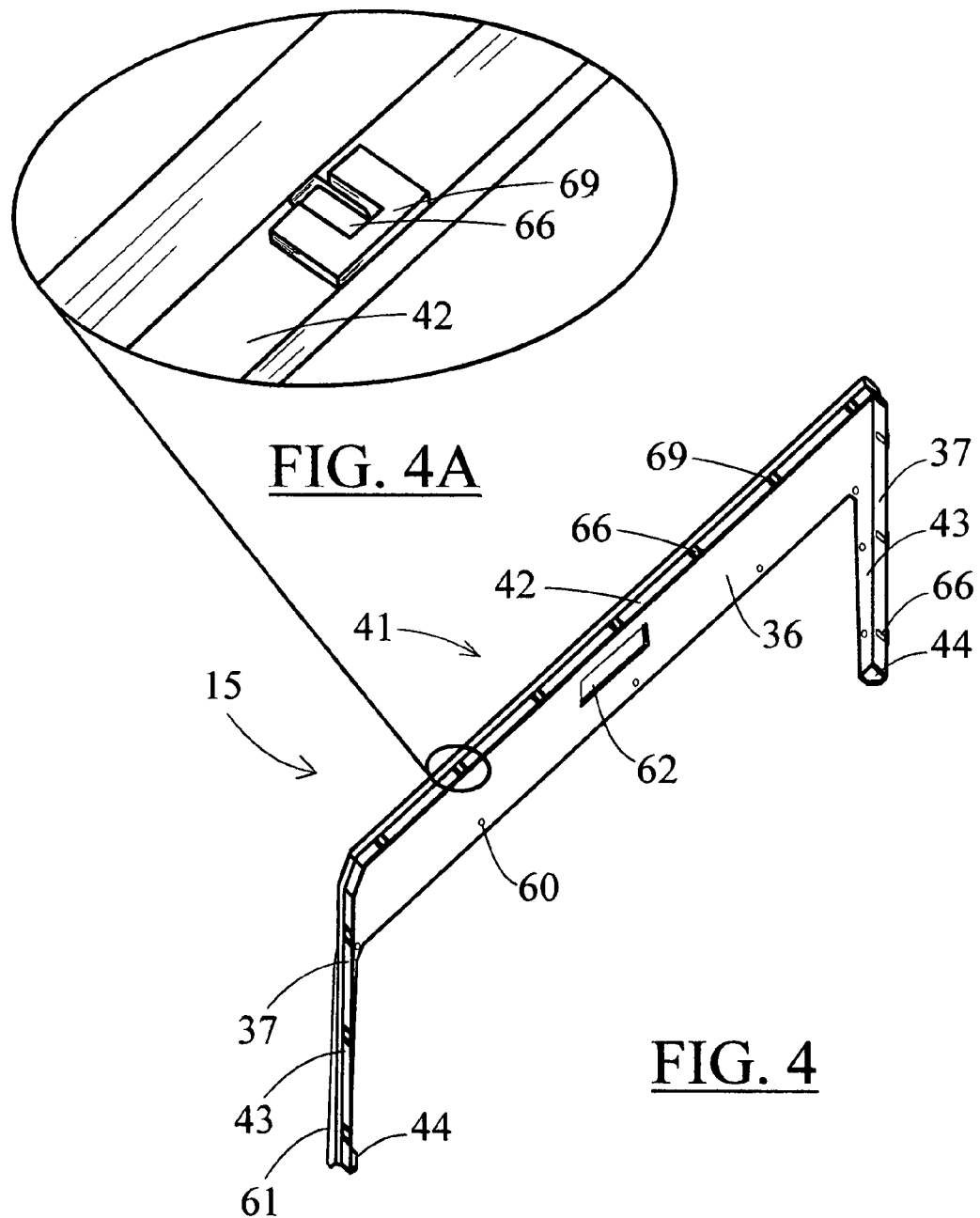
FIG. 4 is a perspective view of a vehicle mounting collar, according to an embodiment of the invention.
FIG. 4A is a perspective detail view of a portion of a vehicle mounting collar, per detail 4A of FIG. 4, according to an embodiment of the invention.

As shown in FIG. 4, the collar includes a collar web 36, or simply a "web," which extends from a collar bulkhead 37. The collar bulkhead has an approximate inverted U-shape, to arch over the bed 23 of the vehicle, as shown in FIG. 1. The terms "approximate" or "approximately" are used herein to refer to a range of values or relative orientations, understood by a person skilled in the pertinent field or skill, as being substantially equivalent to the herein stated values in achieving the desired results, a range typical to the accuracy and precision of conventional tooling, instrumentation or techniques, or a functionally equivalent range of features that produce equivalent results to those described herein.

The collar bulkhead 37 has a bulkhead length 41, to form an overarching bulkhead top 42. A bulkhead leg 43 extends downward to the bed 23 of the vehicle 20 from each end of the bulkhead top, and each bulkhead leg terminates at a bulkhead foot 44. With the bulkhead foot seated upon the bed of the vehicle, as shown in FIG. 1, the collar web 36 seats against the cab 24 of the vehicle.

Figure 3A:
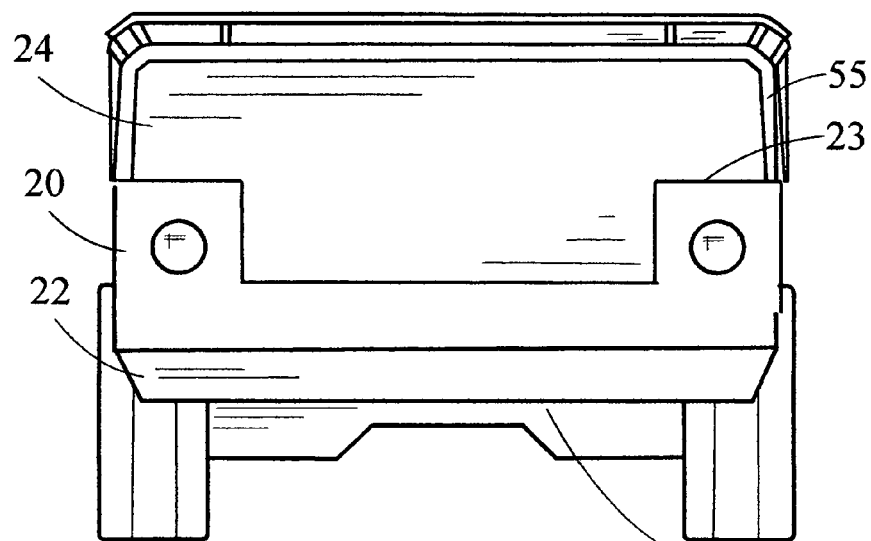
FIG. 3A is a rear elevation view of a vehicle, prepared to receive a vehicle mounting collar, according to an embodiment of the invention.

Specifically, as shown in FIG. 3A, the cab 24 has a rear flange 55, and the rear flange of the cab securely seats and seals to the forward sealing surface 33 of the collar web. As shown in FIG. 1, mounting blocks 57 are preferably employed to clip the rear flange to the collar web, securely seating the collar web to the cab, without requiring holes to be drilled in the rear flange. A waterproof sealing tape, such as a "Pegmatite" brand of sealing tape, as manufactured by DSI, Inc. of Burnsville, Minn., USA, can be utilized between the rear flange and the collar web, providing a sealant layer 58, and ensuring a weather-tight seal. Alternatively, any foam or rubberized gasket could be employed. The sealant layer acts as a gasket between the rear flange end the collar web within each mounting block. A mounting screw 59 received into a mounting hole 60 is most preferably used to lock down the rear flange, seal tape and collar web to the mounting blocks.

Along each bulkhead leg 43, the collar 15 preferably includes a wing seal 61, as shown in FIG. 4. The wing seal protects the joining between the cargo bed cover 30 and the cab 24, as shown in FIG. 1, to prevent water and dust from entering into the gap.

Figure 3B:
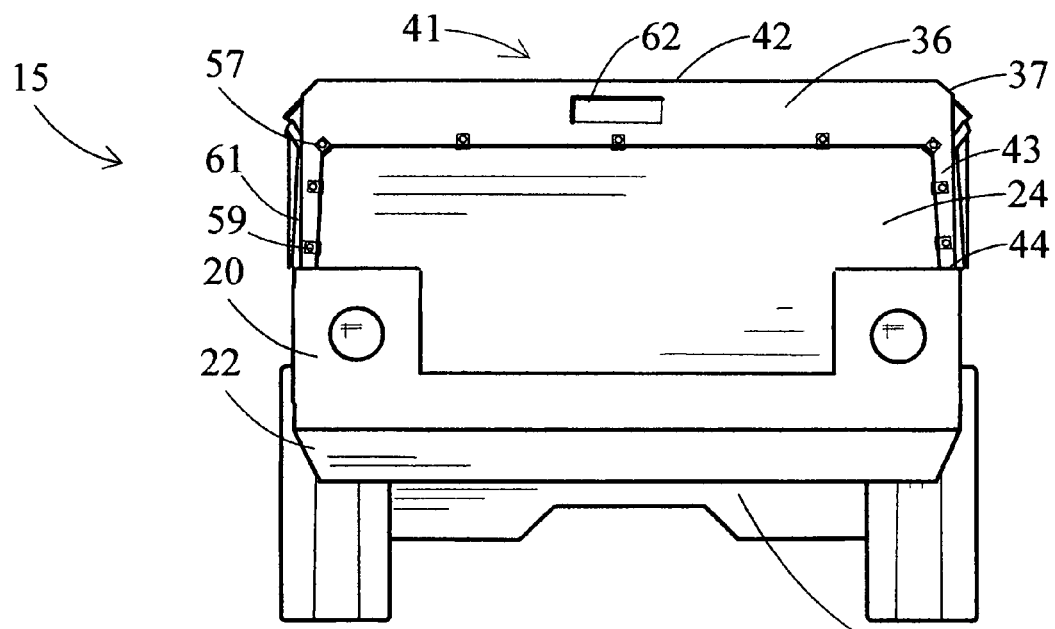
FIG. 3B is a rear elevation view of a vehicle mounting collar, as mounted to a vehicle, according to an embodiment of the invention.

The collar web 36 may include a penetration 62, preferably positioned along the bulkhead length 41, as shown in FIGS. 1, 3B and 4. The penetration allows wiring, air ducts, conduits, trays or pipes to pass through the web. The penetration can be covered with a face plate, or can be partially cut out for easy "pop-out" removal of the covering plug.

The typical cargo bed cover 30 has an outer shell 63, or simply a "shell," as shown in FIG. 2. The shell is mountable to the collar bulkhead 37 with a plurality of shell bolts 65, each received into a bulkhead slot 66, each aligned with a shell hole 68. As shown in FIGS. 4 and 4A, the bulkhead slots are elongated penetrations through the collar bulkhead. The bulkhead slots run approximately horizontally, which allows the shell bolt to travel as the outer shell shifts in position, or to provide for an ample tolerance in the fit of the outer shell onto the vehicle 20. As detailed in FIG. 4A, a spacer block 69 is preferably utilized between the collar bulkhead and the shell. Each spacer block mounts onto each bulkhead slot along the collar bulkhead. The spacer block is preferably a resilient elastomeric material, but may be a metal or any rubber of plastic material, as selected for seating the shell to the collar 15.

The bulkhead slots 66 are preferably located along the bulkhead length 41 and down the bulkhead legs 43, as shown in FIGS. 1 and 4. With the slotted collar bulkhead 37, the outer shell 63 is adjustable and repositionable on the collar 15, by slippage of the shell bolts 65 within the bulkhead slots. The bulkhead slots not only ease installation of the CBC 30 to the bed 23 of the vehicle, but the slots, along with the spacer blocks 69 and the slip-able shell bolts, form a dynamic connection between the cab, the collar and the CBC. This dynamic connection responds to the torsional, side to side, and forward end 21 to rearward end 22 bending of the vehicle 20, which takes place in the base frame 26 of the vehicle, especially in travel over rough terrain and during high speed operations.

The stepwise method of attaching the cargo bed cover 30 to the vehicle 20 with the collar 15 flexibly accommodates large vehicle tolerance variations. Additionally, the collar attaches without interfering with any driver's egress rearward from the cab 24. Also, the vehicle mounting collar provides additional stable structure that can be used for mounting of accessory equipment, such as ventilation systems, communication equipment, and other equipment or materials as well known to those skilled in the design of military personnel vehicles.

Initially, the collar web 36, which is internal to the collar bulkhead 37, is seated against the cab 24, with each of the two bulkhead feet 44 resting on the bed 23 of the vehicle 20, with the bed supported by the base frame 26 of the vehicle. Preferably, the rear flange 55 of the cab is abutted against the forward sealing surface 33 of the collar web with the use of the mounting block 57, to securely seat and seal the rear flange of the cab to the collar web, with the mounting block. By mounting the bulkhead legs 43 upon a bed of the vehicle, the collar is immovable on the bed.

Preferably, the secure sealing of the rear flange 55 of the cab 24 to the collar web 36, is achieved by applying the sealant layer 58 to act as a gasket between a rear flange of the cab and the collar web of the collar, prior to mounting the collar 15 to the bed 23 of the vehicle 20.

The mounting of the shell 63 of the cargo-bed cover 30 onto the collar bulkhead 37 is adjustable on the plurality of shell bolts 65. The shell bolts are inserted into shell holes 68 that match up to the plurality of bulkhead slots 66 within the bulkhead, allowing for the repositioning of the shell on the collar bulkhead by slippage of the shell bolts within the bulkhead slots.

In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible, which employ the same inventive concepts as described above. Therefore, the invention is not to be limited except by the following claims, as appropriately interpreted in accordance with the doctrine of equivalents.

The following is claimed:

1. A vehicle mounting collar comprising:
a collar web extending from a collar bulkhead, the collar bulkhead having an approximately inverted U-shape, the collar bulkhead having a bulkhead length to form an overarching bulkhead top, a bulkhead leg extending approximately downward from each end of the bulkhead top, and each bulkhead leg terminating at a bulkhead foot;
the bulkhead having slots located along the bulkhead length and down the bulkhead legs, the bulkhead foot seated upon a bed of the vehicle and the collar web seated against a cab of the vehicle;
the cab having a rear flange and the collar web securely sealed to the rear flange;
the cargo bed cover having a shell, the shell mountable onto the collar bulkhead with a plurality of shell bolts received into the bulkhead slots, the shell adjustably repositionable on the bulkhead of the collar by slippage of the shell bolts within the bulkhead slots.

2. The vehicle mounting collar according to claim 1, further comprising:
a plurality of mounting blocks for securely sealing the rear flange of the cab to the collar web, the rear flange abutted against the collar web within each mounting block.

3. The vehicle mounting collar according to claim 1, further comprising:
a plurality of mounting blocks for securely sealing the rear flange of the cab to the collar web, the rear flange having a sealant layer, the sealant layer acting as a gasket between the rear flange and the collar web within each mounting block.

4. A vehicle mounting collar comprising:
a collar web extending from a collar bulkhead, the collar bulkhead having a bulkhead length to form an overarching bulkhead top, a bulkhead leg extending approximately downward from each end of the bulkhead top, and each bulkhead leg terminating with a bulkhead foot;
the bulkhead having elongated slots located along the bulkhead length and along the bulkhead legs, the bulkhead foot seated upon a base frame of the vehicle and the collar web seated against a cab of the vehicle;
the cab having a rear flange and the collar web securely seated on the rear flange;
the cargo bed cover having a shell, the shell mountable onto the collar bulkhead, the shell adjustably repositionable on the bulkhead of the collar.

5. The vehicle mounting collar according to claim 4, wherein:
a plurality of shell bolts are received into the bulkhead slots, and the shell is adjustably repositionable on the bulkhead of the collar by slippage of the shell bolts within the bulkhead slots.

6. The vehicle mounting collar according to claim 4, further comprising:
a plurality of mounting blocks for securely sealing the rear flange of the cab to the collar web, the rear flange abutted against the collar web within each mounting block.

7. The vehicle mounting collar according to claim 4, further comprising:
a plurality of mounting blocks for securely sealing the rear flange of the cab to the collar web, the rear flange having a sealant layer, the sealant layer acting as a gasket between the rear flange end the collar web within each mounting block.

8. A method of a vehicle mounting collar system, comprising the steps of:
a) seating a collar web against a cab of the vehicle, the collar web internal to a collar bulkhead, the collar bulkhead having an approximately inverted U-shape, the collar bulkhead having a bulkhead length to form an overacting bulkhead top, a bulkhead leg extending approximately downward from each end of the bulkhead top, and each bulkhead leg terminating at a bulkhead foot;
b) mounting the bulkhead legs upon a bed of the vehicle
c) adjustably mounting a shell of a cargo-bed cover onto the collar bulkhead with a plurality of shell bolts;
d) inserting the shell bolts into a plurality of bulkhead slots within the bulkhead; and
e) repositioning the shell on the collar bulkhead by slippage of the shell bolts within the bulkhead slots.

9. The method according to claim 8, additionally comprising the steps of:
f) abutting a rear flange of the cab against the collar web within a mounting block; and
g) securely sealing a rear flange of the cab to the collar web, the rear flange.

10. The method of the vehicle mounting collar according to claim 8, further comprising:
f) applying a sealant layer to act as a gasket between a rear flange of the cab and the collar web of the collar;
g) abutting a rear flange of the cab against the collar web within a mounting block; and
h) securely sealing the rear flange of the cab to the collar web, with the mounting block.

* * * * *